(12) United States Patent
Mudra et al.

(10) Patent No.: US 10,801,402 B2
(45) Date of Patent: Oct. 13, 2020

(54) CONNECTING ROD FOR AN INTERNAL COMBUSTION ENGINE WITH VARIABLE COMPRESSION

(71) Applicant: ECO Holding 1 GmbH, Marktheidenfeld (DE)

(72) Inventors: Alexander Mudra, Goerlitz (DE); Dietmar Schulze, Muenzenberg (DE)

(73) Assignee: ECO Holding 1 GmbH, Marktheidenfeld (DE)

( * ) Notice: Subject to any disclaimer, the term of this patent is extended or adjusted under 35 U.S.C. 154(b) by 0 days.

(21) Appl. No.: 15/979,805

(22) Filed: May 15, 2018

(65) Prior Publication Data

US 2018/0328276 A1    Nov. 15, 2018

(30) Foreign Application Priority Data

May 15, 2017   (DE) .......................... 10 2017 110 446

(51) Int. Cl.
  *F02B 75/04*    (2006.01)
  *F16K 15/02*    (2006.01)

(52) U.S. Cl.
  CPC ............ *F02B 75/045* (2013.01); *F16K 15/02* (2013.01)

(58) Field of Classification Search
  CPC ................................ F02B 75/045; F16C 7/06
  USPC ....................................................... 123/48 B
  See application file for complete search history.

(56) References Cited

U.S. PATENT DOCUMENTS

| 4,218,961 A * | 8/1980 | Maasberg ................ F01M 1/06 417/568 |
| 4,674,451 A * | 6/1987 | Rembold ................ F01L 9/025 123/198 F |
| 9,670,806 B2 * | 6/2017 | Eckard ............... F01M 13/0011 |
| 9,828,909 B2 * | 11/2017 | Paul .......................... F16C 7/06 |
| 2003/0116198 A1 * | 6/2003 | Wiechers .............. F04B 53/101 137/533.11 |
| 2015/0040562 A1 * | 2/2015 | Anderson ........ F02M 35/10275 60/605.1 |
| 2015/0059683 A1 * | 3/2015 | Schulze .................. F02B 75/32 123/197.3 |
| 2016/0237889 A1 * | 8/2016 | Melde-Tuczai ....... F02B 75/045 |
| 2016/0319737 A1 * | 11/2016 | Schaffrath ............. F02B 75/045 |
| 2017/0356335 A1 * | 12/2017 | Ezaki ........................ F16C 7/06 |

(Continued)

FOREIGN PATENT DOCUMENTS

| DE | 102012112461 A1 | 6/2014 | |
| DE | 102012112481 A1 * | 6/2014 | ............ F02B 75/045 |
| DE | 102012112481 A1 | 6/2014 | |

(Continued)

*Primary Examiner* — Long T Tran
*Assistant Examiner* — James J Kim
(74) *Attorney, Agent, or Firm* — Von Rohrscheidt Patents

(57) ABSTRACT

A connecting rod for a variable compression internal combustion engine, the connecting rod comprising: at least one hydraulic chamber configured in a connecting rod body, wherein the at least one hydraulic chamber is connectable by a check valve with a bearing shell of the connecting rod or with a tank, wherein the check valve includes a closure element and a valve seat, wherein the closure element contacts the valve seat in a blocking position of the closure element and blocks a fluid path, and wherein the closure element is arranged in a bore hole of the connecting rod body and the valve seat is introduced into the connecting rod body.

13 Claims, 6 Drawing Sheets

(56) References Cited

U.S. PATENT DOCUMENTS

2018/0230900 A1* 8/2018 Diehm .................. F02B 75/045

FOREIGN PATENT DOCUMENTS

| DE | 102015103205 A1 | 9/2016 |
| DE | 102015213286 A1 | 1/2017 |
| DE | 102016104958 A1 | 5/2017 |
| WO | WO2016127985 A1 | 8/2016 |

* cited by examiner

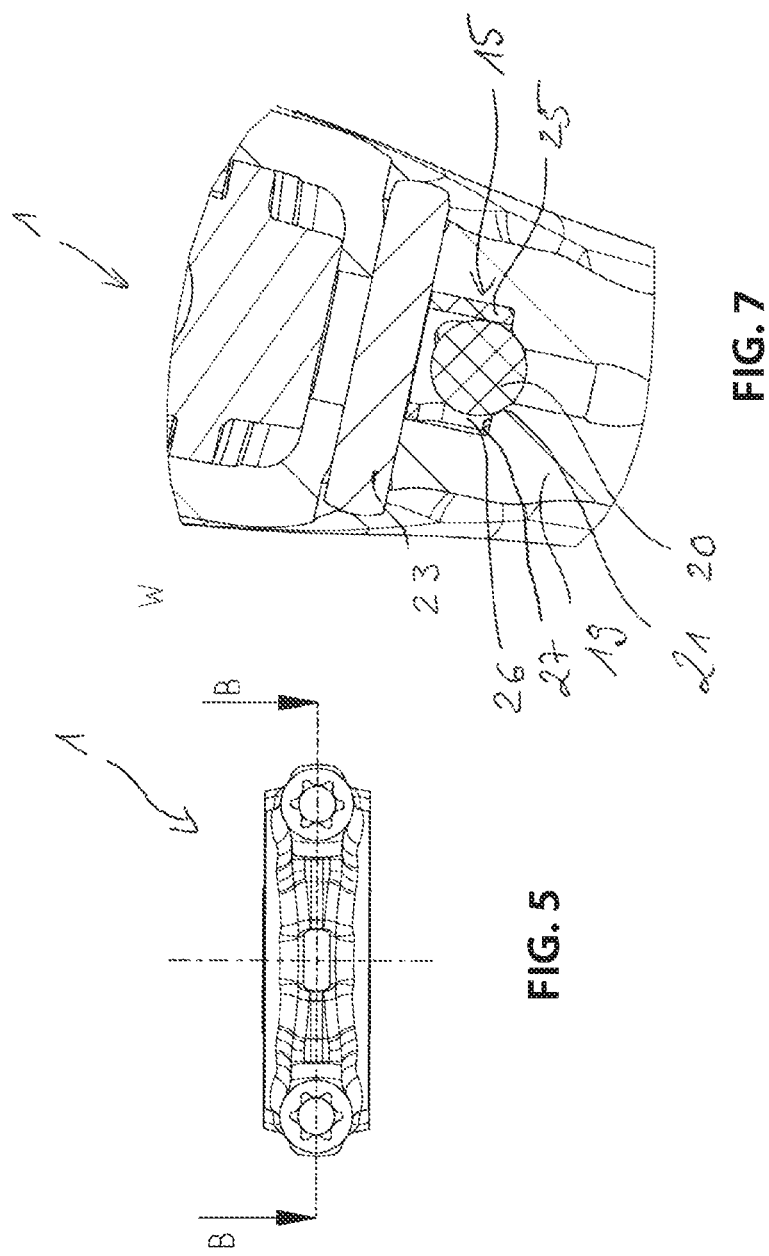
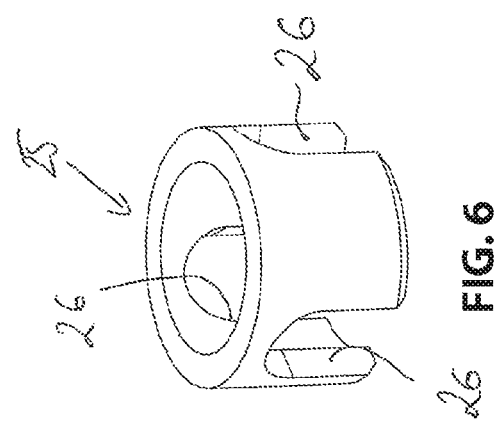

CONNECTING ROD FOR AN INTERNAL COMBUSTION ENGINE WITH VARIABLE COMPRESSION

RELATED APPLICATIONS

This application claims priority from and incorporates the reference German patent application DE 10 2017 110 446.1 filed on May 15, 2017.

FIELD OF THE INVENTION

The invention relates to a connecting rod for a variable compression internal combustion engine with at least one hydraulic chamber configured in a connecting rod body, wherein the hydraulic chamber is connectable by a check valve with a bearing shell of the connecting rod or with a tank, wherein the check valve includes a closure element and a valve seat, wherein the closure element blocks a fluid path in a blocking condition of the closure element by contacting the valve seat. The invention furthermore relates to an internal combustion engine with an adjustable compression ratio with at least one connecting rod.

BACKGROUND OF THE INVENTION

In internal combustion engines a high compression ratio has a positive effect upon an efficiency of the internal combustion engine. Compression ratio is typically defined as a ratio of an entire cylinder cavity before compression to a remaining cylinder cavity after compression. In internal combustion engines with external ignition, in particular gasoline engines that have a fixed compression ratio, the compression ratio, however, may only be selected high enough so that a so-called "knocking" of the internal combustion engine is prevented during full load operations. However, for much more prevalent partial load operations of the internal combustion engine, thus for a lower cylinder charge the compression ratio can be selected at a higher level without "knocking" occurring. The important partial load operations of an internal combustion engine can be improved when the compression ratio is variably adjustable. In order to adjust the compression ratio systems with variable connecting rod length are known which actuate an eccentrical adjustment arrangement of a connecting rod by hydraulically or mechanically actuatable switch valves.

A connecting rod of this type is known for example from DE 10 2012 112 461 A1 and includes an eccentrical element adjustment arrangement for adjusting an effective connecting rod length, wherein the eccentrical element adjustment arrangement includes an eccentrical element that cooperates with an eccentrical element lever and two pistons which are respectively movably supported in a hydraulic chamber and in which eccentrical element rods of the eccentrical element adjustment arrangement that engage the eccentrical element lever are supported. An adjustment travel of the eccentrical element arrangement is adjustable by a switch valve. Adjusting the adjustment travel adjusts the effective connecting rod length. This facilitates controlling a compression of an internal combustion engine. Check valves in the connecting rod which are known e.g. from DE 10 2012 112 481 A1 respectively prevent a flow back of hydraulic fluid from the hydraulic chambers into the bearing shell or a tank.

BRIEF SUMMARY OF THE INVENTION

It is an object of the instant invention to provide an improved connecting rod which facilitates high reliability, high service life and simultaneously facilitates a simplified and thus economical production and assembly.

It is another object of the invention to provide an improved internal combustion engine with adjustable compression ratio and with a connecting rod which are producible in a simple and economical manner.

According to an aspect of the invention, the object is achieved by a connecting rod for a variable compression internal combustion engine, the connecting rod including at least one hydraulic chamber configured in a connecting rod body, wherein the at least one hydraulic chamber is connectable by a check valve with a bearing shell of the connecting rod or with a tank, wherein the check valve includes a closure element and a valve seat, wherein the closure element contacts the valve seat in a blocking position of the closure element and blocks a fluid path, and wherein the closure element is arranged in a bore hole of the connecting rod body and the valve seat is introduced into the connecting rod body.

Advantageous embodiments and advantages of the invention can be derived from the dependent claims, the description and the drawing figure.

A connecting rod for a variable compression internal combustion engine with at least one hydraulic chamber is proposed, wherein the hydraulic chamber is connectable by a check valve with a bearing shell of the connecting rod or with a tank. The check valve includes a closure element and a valve seat. The closure element blocks a fluid path in a blocking position of the closure element by contacting the valve seat. Thus, the closure element is arranged in a borehole of the connecting rod body and the valve seat is fabricated in the connecting rod body. Therefore the check valve is made from very few components so that the connecting rod can be provided in a particularly economical manner. Additional mounting processes can be omitted according to the invention.

The connecting rod according to the invention for a variable compression internal combustion engine can include for example an eccentrical element adjustment arrangement for adjusting an effective connecting rod length. The adjustment travel of the eccentrical element adjustment arrangement can thus be provided adjustable by a switch valve.

Rotating the adjustable eccentrical element adjustment arrangement is initiated by an impact of mass and load forces of the internal combustion engine wherein the mass and load forces impact the eccentrical element adjustment arrangement during an operating stroke of the internal combustion engine. During the operating stroke effective directions of forces impacting the eccentrical element adjustment arrangement change continuously. The rotating movement or adjustment movement is supported by at least one piston that is loaded with a hydraulic fluid, in particular with motor oil and supported in the hydraulic chamber, or the piston prevents a resetting of the eccentrical element adjustment arrangement caused by varying force impact directions of forces impacting the eccentrical element adjustment arrangement.

The pistons are movably supported in hydraulic chambers and loaded by hydraulic fluid through hydraulic fluid conduits from the bearing shell of a crank bearing eye or a tank through check valves. The check valves thus prevent a flow back of the hydraulic fluid from the hydraulic chambers back into the hydraulic fluid conduits into the bearing shell of the crank bearing eye or a tank and thus facilitate pulling hydraulic fluid into the hydraulic chambers.

Advantageously the bore hole directly adjoins the hydraulic chamber. This facilitates producing the borehole in one process step when producing the hydraulic chamber so that a separate inlet conduit between the check valve and the hydraulic chamber can be omitted.

The closure element can be configured, for example, as a ball and the valve seat can be provided as an at least partially concave base of the bore hole. Thus, the ball is made from metal as usual also a ceramic closure element can be advantageous due to its low weight and wear resistance. The valve seat can be provided directly in the connecting rod body and can be fabricated when the bore hole is fabricated. Advantageously, the valve seat is fabricated in a single process step together with the bore hole.

An alternative embodiment provides that the closure element is configured as a plate. The valve seat according to this embodiment is provided as a flat base.

In order to assure a flow through of the check valve, the closure element has a smaller diameter than the bore hole and a predetermined clearance is provided between the closure element and the bore hole.

In case it is necessary to limit the clearance between the closure element and the bore hole the closure element can include one or plural overflow channels.

The overflow channels thus facilitate a required hydraulic fluid flow for a small clearance between the closure element and bore hole.

According to an advantageous embodiment of the invention the closure element is supported in an insert element that is arranged in the bore hole wherein the insert element includes flow recesses which provides a sufficient fluid flow in particular when a ball is used as the closure element without degrading a support of the ball.

Advantageously, a stroke limitation device can be arranged in the connecting rod body wherein the stroke limitation device limits the stroke of the closure element and the bore hole so that a drop out of the closure element is prevented and a quick closure of the check valve can be assured.

According to an advantageous embodiment of the invention a cylindrical pin is provided as stroke limiting device which is impressed into the connecting rod body. The cylindrical pin is a standard component and particularly economical.

BRIEF DESCRIPTION OF THE DRAWINGS

Further advantages can be derived from the subsequent drawing description. The drawings schematically illustrate embodiments of the invention. The drawings, the description and the claims include numerous features in combination. A person skilled in the art will advantageously view the features also individually and combine them into useful additional combinations, wherein:

FIG. 5 illustrates a bottom view of the connecting rod according to FIG. 1;

FIG. 6 illustrates an insert element of a check valve embodiment in a perspective view of the connecting rod according to FIG. 1;

FIG. 7 illustrates a blown up detail W of the partial cross section B-B of the connecting rod according to FIG. 1;

DETAILED DESCRIPTION OF THE INVENTION

Figure 1:
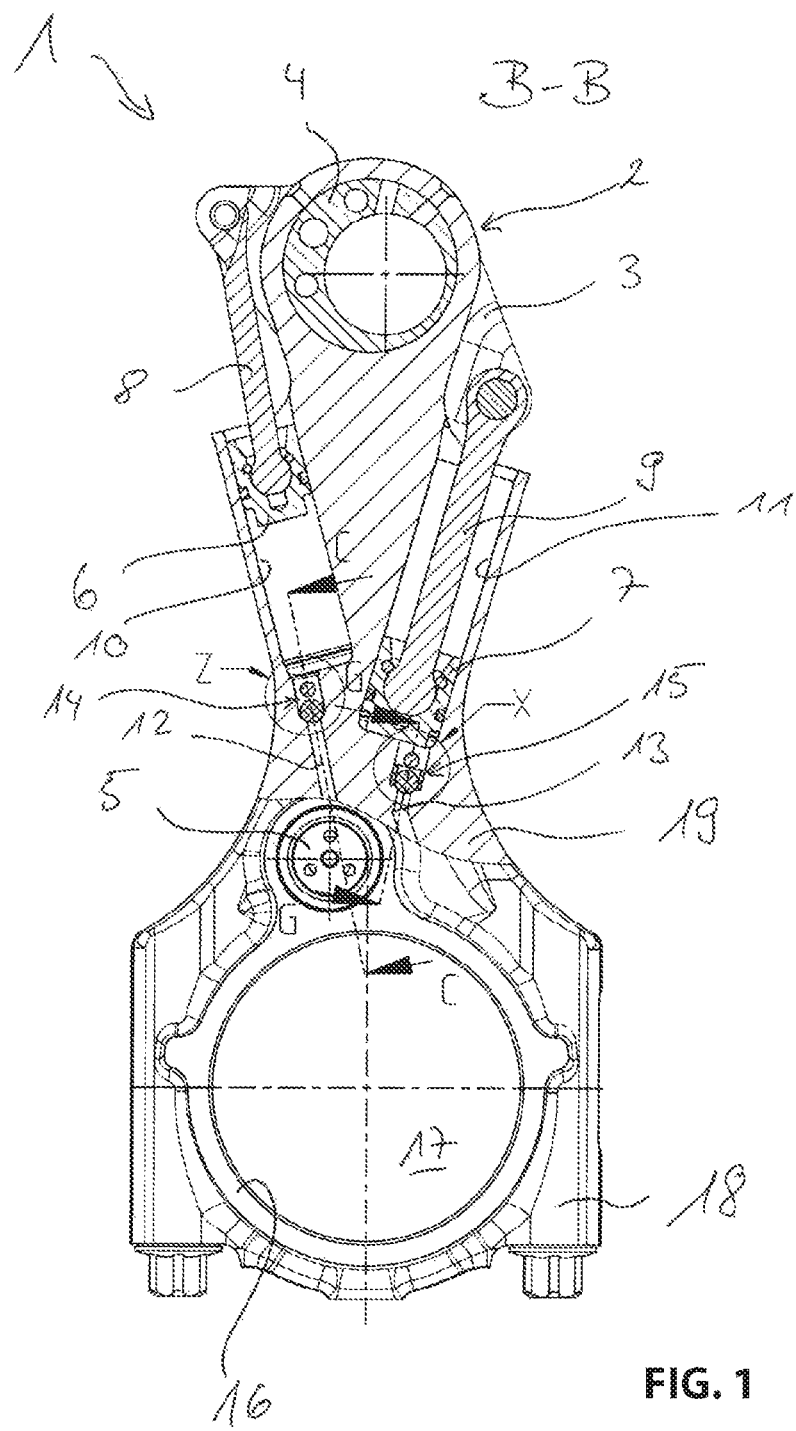
FIG. 1 illustrates a partial sectional view B-B of a connecting rod according to the invention for a variable compression of a motor vehicle with two embodiments of check valves in a schematic view in a position for low compression (ε-low)
Figure 4:
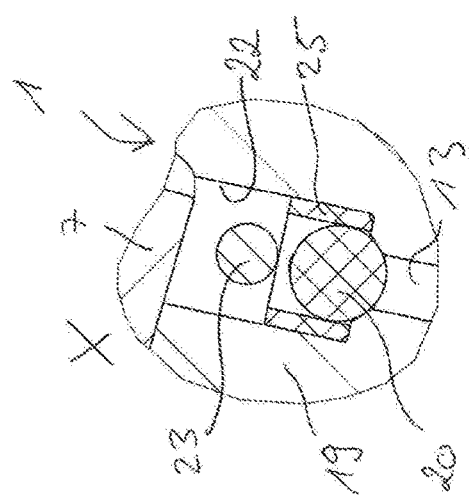
FIG. 4 illustrates a blown up detail X of the partial cross section B-B of the connecting rod according to FIG. 1.

In the drawing figures identical or like components are designated with identical reference numerals. The drawing figures merely illustrate embodiments and do not limit the spirit and scope of the invention.

FIG. 1 illustrates a partially cut front view of a connecting rod 1 for a variable compression internal combustion engine of a motor vehicle with check valves in a schematic view in a low compression position (ε low). A partial sectional view B is illustrated and indicated in a bottom view of the connecting rod 1 that is illustrated in FIG. 5. The connecting rod 1 includes an eccentrical element adjustment arrangement 2 for adjusting an effective connecting rod length. The eccentrical element arrangement 2 includes an eccentrical element 4 that cooperates with a one component or multi-component eccentrical lever 3. Thus, an adjustment travel of the eccentrical element adjustment arrangement 2 is adjustable by a switch valve 5. FIGS. 2 through 7 show additional sectional views and partially blown up views and details of the connecting rod 1.

A rotation of the adjustable eccentrical element adjustment arrangement 2 is initiated by an impact of mass and load forces of the internal combustion engine which impact the eccentrical element adjustment arrangement 2 during an operating stroke of the internal combustion engine. During an operating stroke the impact directions of forces impacting the eccentrical element arrangement 2 change continuously. The rotation or adjustment travel is supported by a piston 6, 7 that is integrated in the connecting rod 1 and that is loaded by hydraulic fluid, in particular motor oil or the pistons 6, 7 prevent a resetting of the eccentrical element adjustment arrangement 2 based on varying forced impact directions of forces impacting the eccentrical element adjustment arrangement 2.

The pistons 6, 7 are operatively connected by eccentrical element rods 8, 9 on both sides with the eccentrical element lever 3 of the eccentrical element adjustment arrangement. The pistons 6, 7 are movably arranged in hydraulic chambers 10, 11 and loaded through hydraulic fluid conduits 12, 13 with the hydraulic fluid through check valves 14, 15.

The hydraulic fluid conduits 12, 13 are connected with the switch valve 5 which is connected through at least one non illustrated hydraulic fluid conduit with a bearing shell 16 of a crank bearing eye 17 off the connecting rod 1 or a tank.

Advantageously, the connecting rod 1 can be configured so that a movement of the pistons 6, 7 occurs in an extension of longitudinal axes of the hydraulic chambers 10, 11 in order to achieve a piston stroke that is as large as possible. Thus, the eccentrical element adjustment arrangement can operate with maximum efficiency.

Thus, the check valves 14, 15 prevent a flow back of the hydraulic fluid from the hydraulic chambers 10, 11 back into the hydraulic fluid conduits 12, 13 and facilitate a pulling of the hydraulic fluid into the hydraulic chambers 10, 11.

The configuration of the described connecting rod 1 is only illustrated in an exemplary manner. Thus, it is possible for example to arrange the switch valve 5 in a portion of the connecting rod cover 18. The switch valve 5 can be configured as a hydraulic valve or alternatively as a mechanically actuatable valve. Furthermore, the hydraulic fluid conduits can also be provided differently from the illustrated embodiment. As a matter of principle, it is also conceivable to configure the eccentrical element adjustment arrangement 2 with only one hydraulic chamber and a single double acting piston.

The check valves 14, 15 are illustrated in FIGS. 2-4, 6 and 7 in a blown up partial sectional view. Thus, the check valves 14, 15 of the connecting rod 1 are illustrated in different embodiments. As a matter of principle both check valves 14, 15, however, can be configured identical and each of the two illustrated and described embodiments can be associated with the hydraulic chambers 10, 11.

Figure 3:
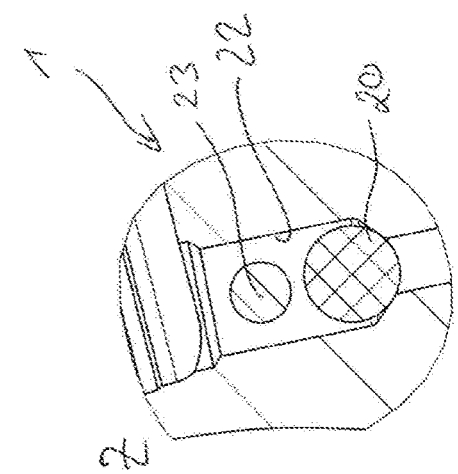
FIG. 3 illustrates a blown up detail Z of the partial cross sectional view B-B of the connecting rod according to FIG. 1.
Figure 2:
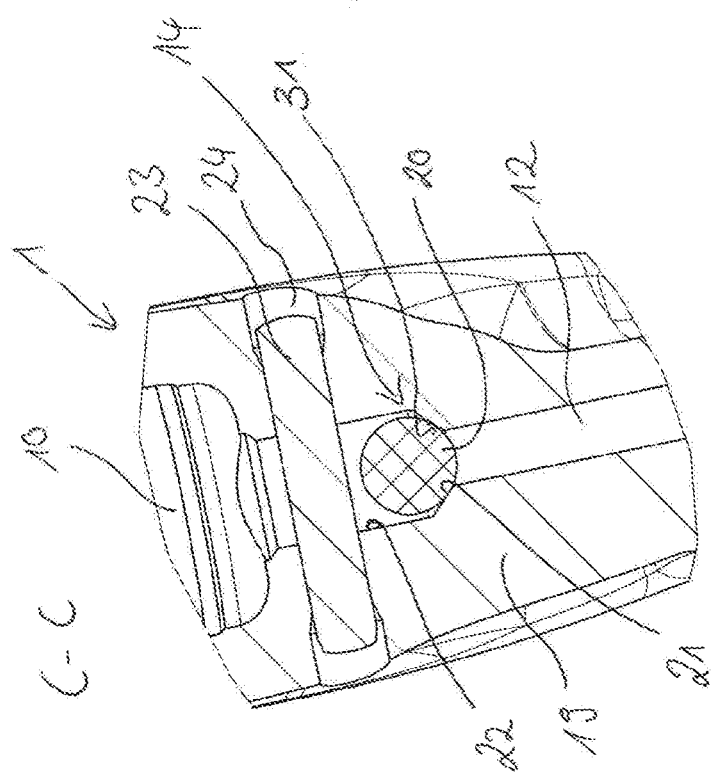
FIG. 2 Illustrates a blown up detail of the sectional view C-C of the connecting rod according to FIG. 1.

A first embodiment of the check valve 14 can be derived from FIGS. 2, 3 which illustrate the sectional view C-C or the detail Z of the connecting rod 1. The check valve 14 includes a closure element 20 and a valve seat 21, wherein the closure element 20 blocks a fluid path in a blocking position by contacting the valve seat 21. As evident from FIGS. 2-3 the closure element 20 is arranged directly in a bore hole 22 of a connecting rod body 19 and the valve seat 21 is introduced directly into the connecting rod body 19. A separate valve housing and additional components can thus be omitted in their entirety. The hydraulic fluid conduit 12 adjoins directly at the bore hole 22 or at the valve seat 21 thus, the hydraulic fluid conduit 12 extends from the bore hole 22 towards the switch valve 5. The check valve 14 thus, includes a minimum number of components so that the piston rod one can be provided in a particularly economical manner.

The bore hole 22 can be advantageously produced in one process step together with producing the hydraulic chamber 10 and a separate inlet conduit between the check valve 14 and the hydraulic chamber 10 can be omitted.

The closure element 20 of the first check valve 14 is configured as a ball which is typically made from metal. A ceramic closure element can be advantageously used and provides low weight and high ware resistance. The valve seat 21 is provided as a concave base 31 of the bore hole 32 so that it can be produced in one process step together with the bore hole 22. The concave circumferential shape of the valve seat 21 can be advantageously fabricated in the connecting rod body 19 in a simple manner by a 90° drill tip.

In order to provide a flow through of the check valve 14, the ball configured as the closure element 20 has a smaller diameter than the bore hole 22 so that a particular clearance is provided between the closure element 20 and the bore hole 22.

Furthermore, a stroke limiting device 23 configured as a cylindrical pin is arranged in the connecting rod body 19 and limits a stroke of the closure element 20 within the bore hole 22 so that the closure element 20 is prevented from falling out and a quick closure of the check valve 14 can be assured. The cylindrical pin is thus introduced into a transversal bore hole 24 which penetrates the bore hole 22. The stroke limiting device 23 is advantageously configured as a standard component in a particularly cost effective manner. However, also other components are conceivable which limit the stroke.

The embodiment of the second check valve 15 illustrated and FIGS. 1-7 supports the ball as a closure element 20 in an insert element 25 arranged in the bore hole 22 wherein the insert element is configured from synthetic material. The insert element 25 includes at least one or plural flow recesses 26 which provide a sufficient fluid flow in particular when the closure element 20 is a ball without degrading a support of the ball.

An impressed cylindrical pin is provided as a stroke limiting device which simultaneously secures the insert element 25 in the bore hole 22. The valve seat 21 is also configured concave at the base 27 of the bore hole 22. Differently from the first embodiment from the check valve 14 the base 27 additionally includes a shoulder for fixing the insert element 25, covering the shoulder transitions in two the concave circumferential 21 for the ball.

FIGS. 8-12 illustrate a second embodiment of a connecting rod 1 which only differs with respect to the embodiment of the second check valve 15. The check valve 15 illustrated therein includes a plate 28 as a closure element 20 which is supported in the bore hole 22 of the connecting rod body which differs from the first embodiment. The plate 28 is supported with a smaller clearance in the bore hole 22 and includes one or plural overflow channels 29 configured as longitudinal grooves at an outside of the plate 28. The overflow channels 29 facilitate the required hydraulic fluid flow also for this embodiment simultaneously providing a small clearance between the closure on 20 and the bore hole 22.

Figure 14:
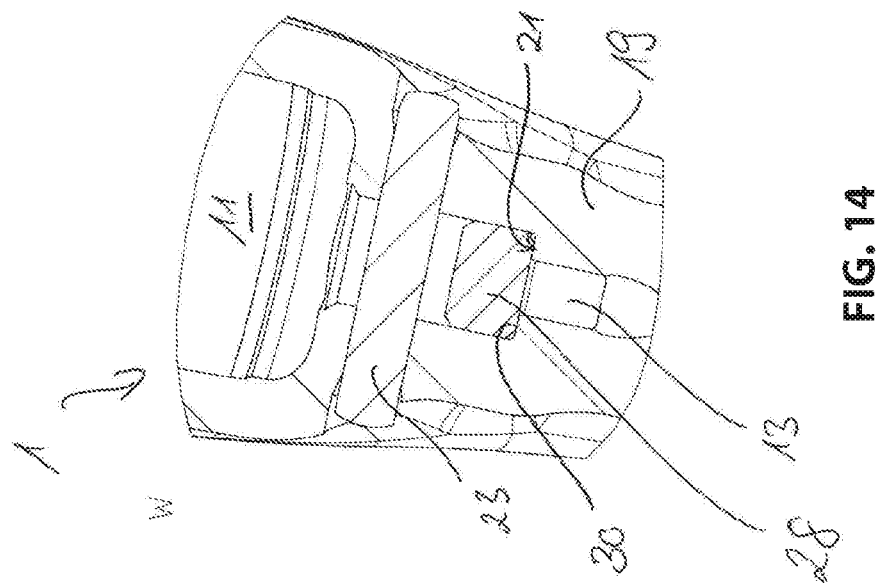
FIG. 14 illustrates a blown up detail W of the partial cross sectional view B-B of the connecting rod according to FIGS. 8 and 9.
Figure 8:
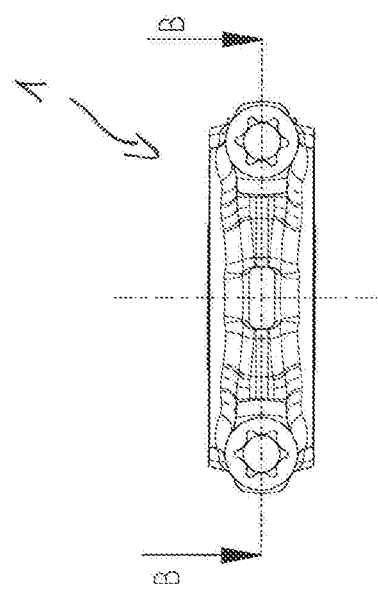
FIG. 8 illustrates a bottom view of a connecting rod according to the invention for a variable compression internal combustion engine of a motor vehicle with two embodiments of check valves in a schematic view in a high compression position (ε-high)
Figure 13:
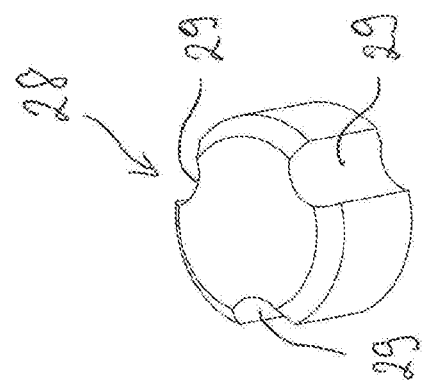
FIG. 13 illustrates a closure element of an embodiment of the check valve of the connecting rod according to FIGS. 8 and 9 in a perspective view.
Figure 9:
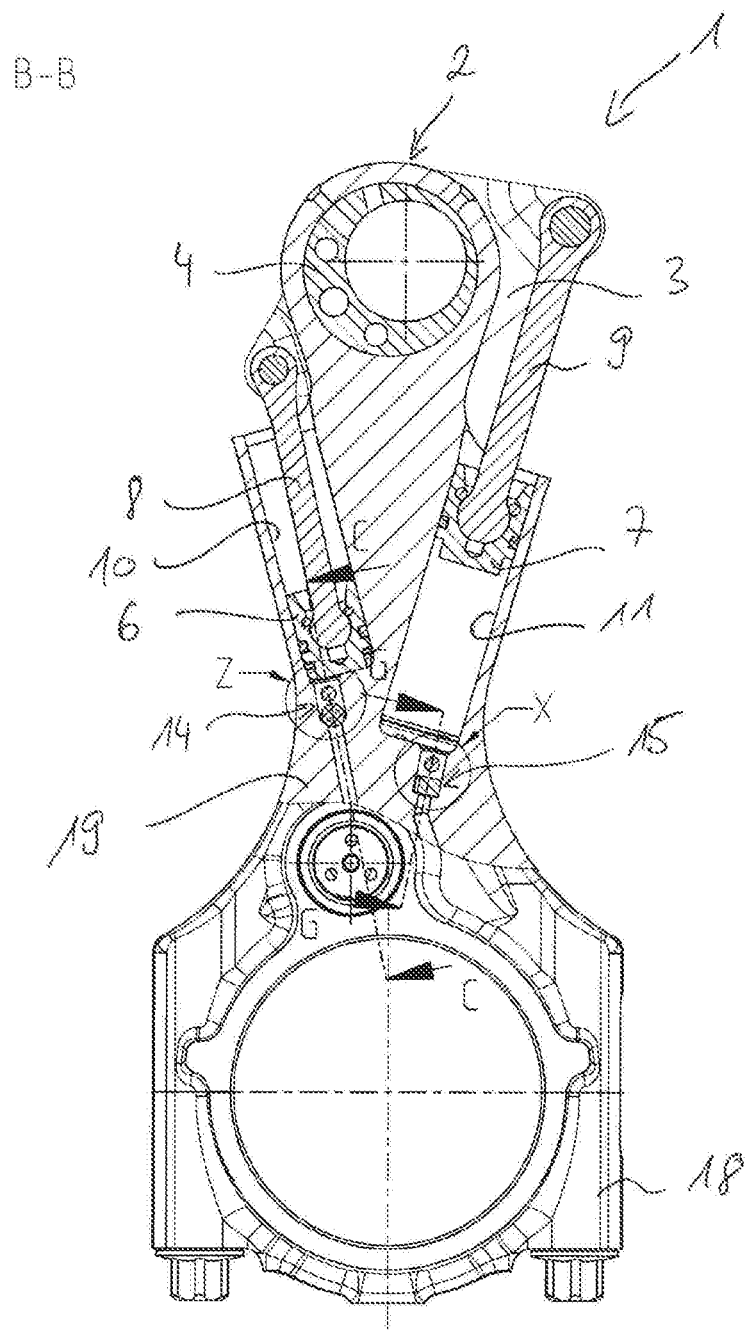
FIG. 9 illustrates a partial cross sectional view B-B of the connecting rod according to the invention according to FIG. 8.
Figure 12:
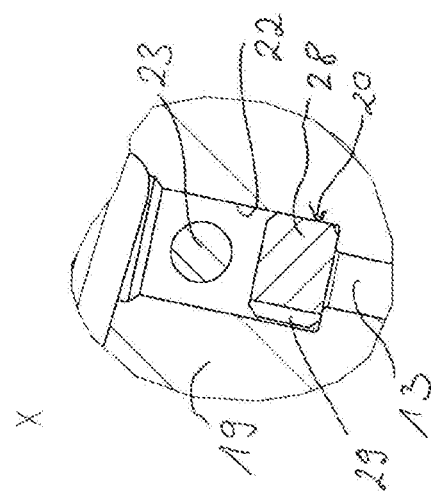
FIG. 12 illustrates a blown up detail X of the partial sectional view B-B of the connecting rod according to FIGS. 8 and 9.
Figure 11:
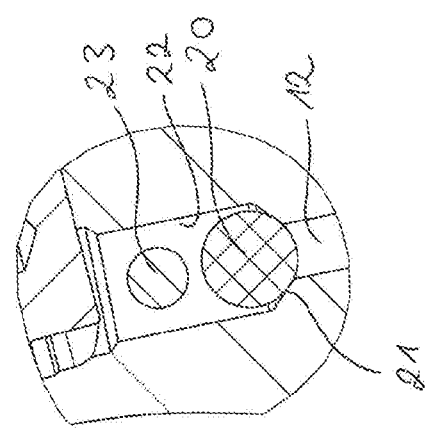
FIG. 11 illustrates a blown up detail of the partial cross sectional view B-B of the connecting rod according to FIGS. 8 and 9.
Figure 10:
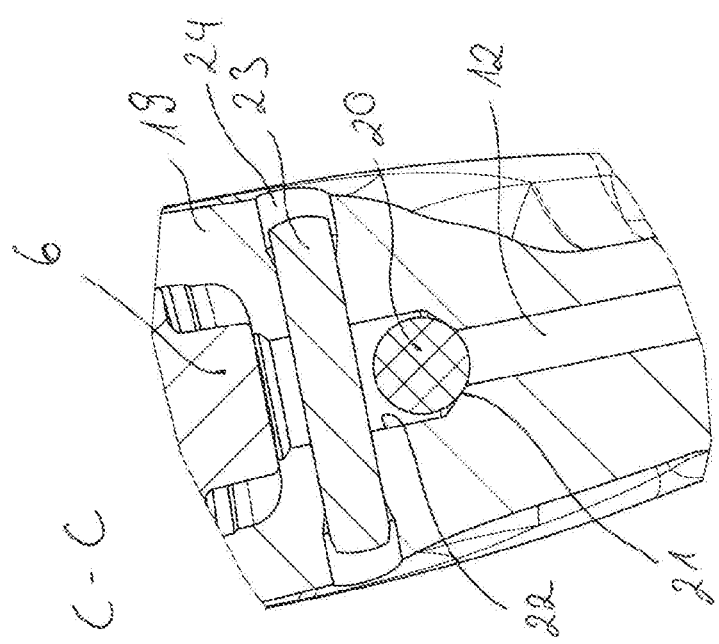
FIG. 10 illustrates a blown up detail of the sectional view C-C of the connecting rod according to FIGS. 8 and 9.

As evident in particular from FIG. 14 a flat base 30 of the bore hole 22 is provided orthogonal to an opening direction of the plate 28 and thus forms the valve seat 21.

What is claimed is:

1. A connecting rod for a variable compression internal combustion engine, the connecting rod comprising:
    two hydraulic chambers configured in a connecting rod body,
    wherein the two hydraulic chambers are respectively connectable by check valves with a bearing shell of the connecting rod or with a tank,
    wherein the check valves respectively include closure elements and valve seats,
    wherein the closure elements respectively contact the valve seat in blocking positions of the closure elements and block a fluid path,
    wherein the closure elements are respectively arranged in bore holes of the connecting rod body and the valve seats are fabricated in the connecting rod body wherein the valve seats are respectively integrally formed in one piece with the connecting rod body from tapered interior surfaces of the connecting rod body and the closure elements are respectively supported on the tapered interior surfaces of the connecting rod body that form the valve seats, wherein axes of the valve seats that are integrally formed in one piece with the connecting rod body respectively intersect with a longitudinal axis of the connecting rod body, and wherein the valve seats that are integrally formed in one piece with the connecting rod body are arranged at different longitudinal positions relative to the longitudinal axis of the connecting rod body.

2. The connecting rod according to claim 1, wherein the bore holes are respectively directly adjacent to the hydraulic chambers.

3. The connecting rod according to claim 1, wherein the closure elements are respectively configured as balls and the valve seats are respectively at least partially provided as concave bases of the bore holes.

4. The connecting rod according to claim 2, wherein the closure elements are respectively configured as plates.

5. The connecting rod according to claim 1, wherein the closure elements have smaller diameters than the bore holes.

6. The connecting rod according to claim 1, wherein the closure elements respectively include one or plural overflow channels.

7. The connecting rod according to claim 1, wherein the closure elements are supported in inserts that are arranged in the bore holes, and wherein the inserts include flow recesses.

8. The connecting rod according to claim 1, wherein stroke limiting devices are arranged in the connecting rod body, and wherein the stroke limiting devices respectively limit strokes of the closure elements in the bore holes.

9. The connecting rod according to claim 8, wherein cylindrical pins are provided as the stroke limiting devices and impressed into the connecting rod body.

10. A variable compression internal combustion engine, comprising: at least one connecting rod according to claim 1.

11. The connecting rod according to claim 1, wherein the longitudinal axis of the connecting rod body intersects one of the two hydraulic chambers.

12. The connecting rod according to claim 1, wherein an axis of one of the check valves intersects with a switch valve.

13. The connecting rod according to claim 1, wherein an axis of one of the check valves intersects with the longitudinal axis of the connecting rod above a bearing surface of the bearing shell of the connecting rod and an axis of another of the check valves intersects with the longitudinal axis of the connecting rod below a bearing surface of the bearing shell of the connecting rod.

\* \* \* \* \*